Nov. 21, 1972 R. W. GUNDLACH ET AL 3,703,376

INDUCTION IMAGING SYSTEM

Filed June 29, 1970 4 Sheets-Sheet 1

INVENTORS
ROBERT W. GUNDLACH
RICHARD C. VOCK
BY
J. D. Maccarone
ATTORNEY

INDUCTION IMAGING SYSTEM

Filed June 29, 1970

3,703,376
INDUCTION IMAGING SYSTEM
Robert W. Gundlach, Victor, and Richard C. Vock, Ontario, N.Y., assignors to Xerox Corporation, Stamford, Conn.
Continuation-in-part of abandoned application Ser. No. 697,084, Jan. 11, 1968. This application June 29, 1970, Ser. No. 50,763
Int. Cl. G03g *13/22, 15/22*
U.S. Cl. 96—1 R 30 Claims

ABSTRACT OF THE DISCLOSURE

The invention relates to an induction imaging system suitable to accomplish development of an electrostatic latent image at a point remote from the photosensitive surface on which the latent image is originally formed. In one embodiment, an image support member bearing an electrostatic latent image is presented to a self-supporting film in the form of a continuous induction web, an image being thereby induced in the web, developed thereon and subsequently transferred to a receiver material. The continuous induction web may be charged with a negative, positive, ground or alternating potential while in contact with the image support member depending on the polarity of the electrostatic latent image on the image support member; or the continuous web may not be externally charged where only line copy reproduction is desired.

In another embodiment of the invention, an image support member carrying an electrostatic latent image is presented to a receiver material having a bulk resistivity in the range of from about $10^7$ to $10^{14}$ ohm-cm. An electrostatic image is induced in the receiver material, developed thereon and fixed thereto or transferred to a secondary copy sheet material and fixed thereon.

CROSS-REFERENCE TO RELATED CASES

This application is a continuation-in-part of copending application, Ser. No. 697,084 filed Jan. 11, 1968, and now abandoned.

BACKGROUND OF THE INVENTION

It is known that electrostatic images may be formed and developed on the surfaces of certain materials generally by charging a photoconductive insulating surface and dissipating the charge selectively by exposure to a pattern of activating radiation. Whether formed by these means or some other approach, the resulting electrostatic charge pattern is conventionally utilized by the deposition of electroscopic marking particles thereon through electrostatic attraction there being formed a visible image or image body of electroscopic matter corresponding to the latent image. This image may then be fixed in place or transferred to a second surface to form what is known as an electrostatic print.

The above described process is capable of producing excellent copies and is in widespread use. However, the photoconductive insulating layer is subject to appreciable wear in that it is generally contacted with a relatively abrasive toner-carrier bead composition and must be cleaned of residual toner particles followed each exposure step. This has considerably limited the materials that may be used in a reusable system to those having a hard, tough abrasion resistant surface. Therefore, in some cases, it is desirable to carry out the development or deposition of image material at a point remote from the photosensitive surface either on the ultimate print supporting member or some other surface, thus eliminating the degradation of the photoconductive surface as well as simplifying the process by eliminating the need for cleaning the photoreceptor following each cycle. A process has been developed wherein a latent eletcrostatic image is formed on the surface of an insulating layer and a slightly conductive sheet of receiving material applied to the image surface of the layer. The back of the sheet is grounded and then stripped from the insulating layer resulting in the induction of a latent image on the receiving sheet which is opposite in polarity but the same in sense as the image on the surface of the original insulating layer. A further discussion of this process is disclosed in copending U.S. Pat. application Ser. No. 867,049, filed Oct. 16, 1969, now U.S. Pat. No. 3,551,146 and incorporated by reference herein. The induced image is then developed with the above mentioned electroscopic marking material to make visible the induced latent image.

Basically, this system has been found highly successful in image reproduction without contacting the surface of the imaged photocondutcive plate with developers. However, in some cases where line copy only is desired to be reproduced, it would be desirable to further simplify the process. Furthermore, the partially conductive receiver material is generally required to be a relatively thin material thereby limiting to a great extent the types of materials that may be used as the image receptive member. Generally speaking, the majority of the materials utilized therein which will satisfy the requirements of the process are substantially humidity sensitive materials and therefore at a relative humidity of about 80% or greater the induction imaging process experiences a loss in effectiveness. It would, therefore, also be desirable to have an induction imaging system which will not be affected to any substantial degree by the environmental conditions within which it may be carried out.

SUMMARY OF THE INVENTION

It is therefore an object of this invention to provide a xerographic process and, more broadly, a novel imaging system providing the above-noted desirable features.

Another object of the invention is to provide an imaging system utilizing a novel induction imaging apparatus.

It is a further object of the invention to provide a novel induction imaging process.

It is a still further object of this invention to provide a humidity insensitive induction imaging system.

Yet another object of this invention is to provide a highly versatile induction imaging system which is capable of being practiced in a continuous mode.

It is yet another object of this invention to provide a novel induction imaging system capable of producing good continuous tone and solid area images as well as good line copy.

It is still another object of this invention to provide a method for inducing electrostatic latent images in receiving sheets made up of relatively conductive materials which include paper.

Further still, it is an object of the invention to provide a simplified method for inducing, in relatively conductive receiver materials, electrostatic latent images corresponding to line copy original materials.

The foregoing objects and advantages are accomplished in accordance with the invention, broadly speaking, by providing a highly versatile induction imaging system capable of being operated effectively and providing excellent results over a broad spectrum of conditions. Thus, embodiments of this novel induction imaging system may be selected with respect to certain variables attendant with any particular utilization thereof, these variables including the environmental conditions within which the system is employed, the speed at which the system is operated, the type of material within which a latent electrostatic image is desired to be induced and the type of copy desired to be reproduced. According to one embodiment of the system, there is provided a novel continuous induction imaging apparatus comprising, generally speaking, a self-supporting film in the form of a continuous web and an electrostatic latent image bearing member. The image bearing member is brought into contact with the continuous web thereby inducing an image in the web corresponding to that carried by the image support member. The web material may be alternatively supplied with a negative, positive, ground or alternating potential while in contact with the latent image support member depending upon the polarity of the charge of the electrostatic latent image on the particular support member; or the web material may be brought into contact with the image support member without providing any external charging of the web. During or immediately after separation of the web from the image support member, the induced electrostatic latent image is developed with electroscopic marking particles, commonly referred to in the art as toner material, and the resulting developed image in turn is transferred from the web support to a secondary surface such as a paper copy sheet and fixed thereto. The self-supporting web is generally preferred to be slightly conductive so that the electrostatic latent image is induced in the web rather than on the surface thereof. The partially conductive nature of the web material further contributes to the brushless cleaning effect realized in the system whereby any residual toner image left on the recycling web will not interfere with subsequent imaging. The original support member with the latent electrostatic image preserved thereon may then be recycled in the system, each time inducing a new image in the self-supporting continuous web until the desired number of copies are reproduced.

In another embodiment of the invention which is particularly adapted to the reproduction of line copy original material the novel induction imaging system provides a process whereby a latent electrostatic image may be induced in a receiver sheet having a bulk resistivity of from about $10^7$ to $10^{14}$ ohm-cm. The image bearing support member is brought into contact with the above-described receiver sheet, the latter not being electrostatically charged by external means while in contact therewith, thus resulting in a latent image corresponding to that carried by the support member (but opposite in polarity) being induced in a receiver sheet. During or shortly after separation of the receiver sheet from the support member the induced image may be developed on the receiver sheet in accordance with any xerographic development system which responds to a given image polarity and subsequently fixed thereto; or the developed image may in turn be transferred from the receiver sheet to a final copy sheet by any of many xerographic transfer methods and fixed thereon. The receiver sheet may be in the form of individual sheets of material such as paper or it may be in the form of a continuous sheet.

These and other objects and advantages of the invention will be more clearly understood from the following detailed description of various preferred embodiments thereof particularly when read with reference to the accompanying drawings in which.

Figure 1:
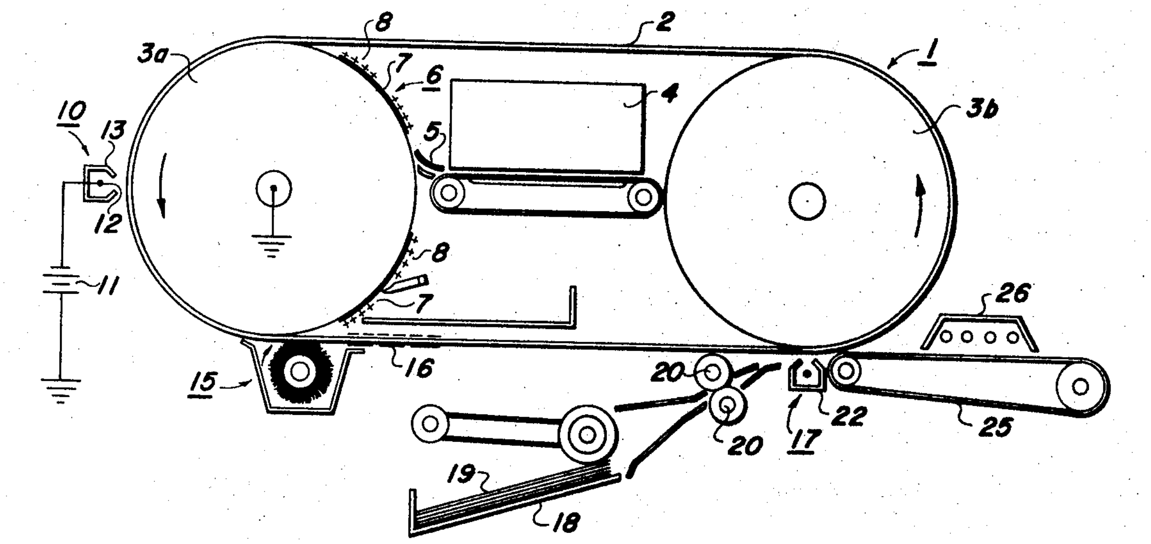
FIG. 1 represents a side sectional view of an exemplary continuous induction imaging apparatus suitable for the practice of an embodiment of the invention.

Referring now to FIG. 1, there is seen an endless belt or web configuration generally designated 1 made up of a thin film, generally moisture insensitive material 2 mounted on drive rollers 3*a* and 3*b*. An electrostatic charge pattern or latent image is formed at the exposure station 4 by one of a number of suitable techniques. For example, an electrostatic latent image may be formed on a photoconductive insulating surface through the steps of charging the surface and selectively dissipating the charge by exposure to a pattern of electromagnetic radiation according to the process disclosed in U.S. Pat. No. 2,297,691. Other methods of forming the electrostatic charge pattern may be used, such as, for example, by selective deposition of electrostatic charge, as by impressing a charge through an image stencil, on an insulating surface to form a pattern of such charge, imposing a potential on a shaped conductor or electrode, or the like. Thus, the image may be formed, as stated above, on a xerographic photosensitive member comprising a photoconductive insulating layer overlying a conductive substrate or on such other combination as may be desirable to provide an electrostatic charge pattern on an insulating surface.

The insulating or photoconductive layer which bears the electrostatic charge pattern may consist of any suitable material capable of holding electrostatic charge for sufficient time to permit the desired number of copies to be produced. In addition, as stated above, it is desirable that the particular image bearing material be, by nature, flexible so as to conform to the curvature of the drive roller upon which it is wrapped. Typical such materials are Mylar, polyethylene terephthalate, commercially available from E. I. du Pont de Nemours, Inc.; Teflon, polytetrafluorethylene, commercially available from E. I. du Pont de Nemours, Inc.; Tedlar, polyvinylfluoride, commercially available from E. I. du Pont de Nemours, Inc.; Staybelite resins, a family of thermoplastic synthetic resins prepared from hydrogenated rosin, commercially available from the Hercules Powder Company, styrene polymers such as Velsicol, a styrene terpolymer, commercially available from the Velsicol Chemical Corporation; and the Piccolastic resins, a styrene polymer available from the Pennsylvania Industrial Chemical Corporation, ethyl cellulose; cellulose acetate; polycarbonates such as Plestar, commercially available from General Aniline and Film Company; polyethylene; polypropylene; polymeric materials such as casein and Parlon-P, the latter being a chlorinated natural rubber commercially available from the Hercules Powder Company; and polyvinyl chloride. When photosensitive plates are utilized or the drive roller itself is a photoconductive drum typical materials which may be used include the conventional photoconductive insulating material such as of the nature disclosed in U.S. Pats. Nos. 3,121,006 and 3,121,007. When the photosensitive material is utilized the base or backing substrate used in preparing the respective photoconductive plate is generally chosen so as to satisfy the desired flexibility requirements of the present system. Generally, therefore, most of the conventional support materials may be used such as aluminum, brass, copper, zinc, paper and any suitable plastic substrate or the like having the necessary conductivity properties.

When the electrostatic latent image or charge pattern is formed by way of a photoconductive insulating plate the surface of the plate is uniformly charged as by corona discharge in the dark and the surface selectively exposed to an electromagnetic radiation source. Due to the photoconductivity of the layer the charge will be dissipated in those areas which are struck by light. Typical photoconductive materials which are suitable for use in the corresponding photoconductive insulating layer are selenium, sulfur, anthracene, inorganic photoconductive pigments, such as zinc oxide or cadmium sulfide dispersed in inert binder resins, organic photoconductive pigments such as phthalocyanine, dispersed in inert binder resins, a homogeneous photoconductive layer or organic photoconductive material, such as, for example, poly-N-vinyl carbazole sensitized with 10% by weight of 2,4,7-trinitro-9-fluorenone and charge transfer complexes of Lewis acids and aromatic resins such as are disclosed in copending U.S. patent application Ser. No. 426,409, filed January 18, 1965 now Pat. No. 3,408,183, and having a common assignee.

In the present illustration the image support member 6 is directed onto the surface of drive roller 3*a* by guide 5 and is held thereto by any suitable means such as the necessary fasteners or a vacuum seal. The image bearing member 6 consists of a support substrate 7 having on its surface an electrostatic charge pattern 8 representing the pattern to be reproduced.

The continuous induction web 2 consists of any suitable self-supporting film member, which may be prepared from a wide variety of materials. It is generally preferred that the film material be slightly conductive having a bulk resistivity ranging from about $10^7$ to about $10^{14}$ ohm-cm. Within this range, it is preferred that the resistivity of the film be about $10^9$ to about $10^{12}$ ohm-cm. and that the web material be moisture resistant through all practical humidities so as to permit optimum use under all environmental conditions. Although this latter requirement is not absolutely necessary, it is desirable to lend the necessary versatility and flexibility to the proposed system and permit extensive use as required. Thus, this particular embodiment of the system may be utilized, if desirable, under environmental conditions of relative humidity readings greater than 75 percent. The induction film material shall be durable enough to withstand the mechanical stresses of continued recycling and as thin as possible to insure and maintain the highest degree of image resolution with thicknesses ranging from about 0.5 to about 3 mils wilth a preferred range for optimum results being from about 1 to about 1.5 mils. Typical materials capable of satisfying the above requirements include: doped Mylar, polypropylene, polyethylene, Tedlar, and various resin impregnated papers such as polyethylene impregnated paper or pigment filled papers. As mentioned above, the web material or film is generally preferred to be slightly conductive so that the electrostatic latent image is induced *in* rather than *on* the surface of a film. In addition, the relative conductive nature of the permanent induction imaging web leads to a dissipation of the image induced in the film thereby permitting recycling without accumulating residual images.

The image support member 6 is then disposed in contact or virtual contact with the inner surface of the continuous web 2 separated only by a very thin air gap. According to one embodiment of the system, there is positioned in close proximity to the web a charging station or corona grounding station 10 connected to a potential source 11. While the image support member 6 is in contact with the continuous film 2 a potential is applied to the free outer surface of the continuous film by a corona discharge wire 12 surrounded by shield 13. As a result of this applied potential an enhanced electrostatic latent image is induced in the first or inner surface of the continuous film corresponding to the latent image 8 on the image support member 6. Depending upon the polarity of the electrostatic charge of the latent image, the potential applied at the charging station 10 to the outer or second surface of the web may be negative, positive, ground or of an alternating nature. The potential applied to the free outer surface of the continuous film functions as a reference potential to give development of solid area images. Thus, with respect to the reproduction of original images which have wide, solidly dark areas as well as, or in addition to, line copy it is preferred to employ the technique of applying a potential to the continuous film in the manner described. It will be appreciated by those skilled in the art that the applied potential should preferably be closely matched to the potential of the background or non-image areas to avoid high background or "washed out" low density images. An induced image will be realized even if this corona "grounding" device is eliminated, however, with an "edge-only" characteristic which lacks solid area reproduction. In this instance the continuous web should be slightly conductive.

This external "grounding" of the free surface of the receiving member is preferred in many imaging applications where solid area development is desired; however, especially for line copy reproduction which comprises the bulk of office copying, a xerographic development system which senses only differences in potentials instead of absolute potentials is suitable to provide a development system which yields copies having clean backgrounds over a wide range of image exposures. Accordingly, in another preferred embodiment of the system, the corona "grounding" device previously described is eliminated and the continuous film 2 is not contacted with any externally applied potential while in contact with the image support member. With respect to this mode of the induction imaging system, an image is again induced in the continuous web 2; however, the induced image has an "edge-only" characteristic which lacks solid area development with the result that solid areas; considerably over about 1/32 inch in dimension, show "edge-only" or edge enhanced development which is acceptable in line copy imaging requirements found, for example, in most offices.

Relative to the operation of the embodiment without the external "grounding" means, induction of charge is forced between adjacent points of different potentials by virtue of lateral migration. While this particular embodiment will not result in solid area image development, it does have an extremely valuable characteristic, namely, that is provides very beneficial effects with relation to increasing the exposure latitude over which images may be reproduced. Thus, this embodiment provides increased latitude in reproducing line copy original images which contain image areas of different density and also over varying ranges of exposure. It can therefore be readily appreciated by those skilled in the art that the present induction imaging system is capable of highly versatile application. Merely by selecting one of the embodiments described above with respect to the particular original image desired to be reproduced, excellent copies of original images can be made. The selection of a particular embodiment presents no difficulty in the practice of the invention for the activation of the corona "grounding means" or conversely the inactivation thereof can be accomplished merely by turning a switch. This particular concept of inducing an image in a material also finds valuable applicability with respect to another embodiment of the induction imaging system, namely that wherein the image is induced directly in a receiver sheet as will subsequently be described in detail below.

The image is induced in the continuous film or web in a time period determined by the resistivity of the web or film material. The induced image next passes to the development station generally designated 15 where development takes place upon separation of the continuous web from the drive roller. The development system is represented in the present illustration as a magnetic brush developer. The magnetic brush means consists of a magnet on the surface of which is held a magnetic carrier with which is mixed a toner material. The magnetic field holds the carrier particles in a brush like configuration. As this brush passes over the induced image areas, electrostatically charged toner particles are attracted to the outer surface of the continuous film corresponding to the latent image induced on the inner surface of the same film to produce visible image 16. Such magnetic brush development is described in more complete detail in U.S. Pats. 2,975,758 and 2,846,333. Although the present illustration utilizes a magnetic brush development technique, any suitable development process utilizing a conductive developer system may be used. Other developer methods which may be effectively used to develop induced electrostatic images include electroded cascade development as described in U.S. Pat. 2,618,551 and 2,618,552, skid development as described in U.S. Pat. 2,895,847, transfer (touchdown) development as described in U.S. Patent 3,166,432, electroded powder cloud development as described in U.S. Patent 2,221,776 and liquid development as described in U.S. Patent 2,891,911. The preferred mechanism is in the use of the magnetic brush system in that it is the most expedient manner of presenting a conductive developer to the surface of the web. By conductive developer is meant a development system which includes at least one conductive element. A conductive developer is used in order to prevent ionization at the point of separation of the continuous film 2 from the drive roller **3*a* thus permitting image preservation on the original image support member 6**. In addition, the conductive developer assists in the complete eliminataion of any residual image. In the case of the electroded systems, a developer electrode similar to that disclosed in U.S. Pat. No. 2,952,241 may be utilized.

It is important to note that when the continuous web does not receive any charge from external means while in contact with the image bearing member, the development technique used does not have to be a conductive system. In this embodiment of the process where "edge-only" development occurs, the electric fields in the continuous web are located on both sides of a boundary of about 1/32 inch in dimension and do not extend to the photoconductive plate during separation of the web from the plate. Thus, when separation takes place, no ionization occurs which could produce a field sufficient to cause field breakdown and result in the destruction of the latent image support member as well as the induced latent image in the web. Therefore, any development system which responds to a given image polarity may be employed.

The developed image 16 is carried on the surface of the continuous web 2 to the transfer station generally designated 17 which includes a suitable sheet feeding mechanism 18 adapted to feed, in the case of the present illustration, sheets of paper successively to the web in coordination with the presentation of the developed image 16 on the web to the respective secondary surface at the transfer station. The transfer sheets may then consist of conventional opaque, moisture absorbing copy paper or humidity sensitive materials of any desired thickness. Typical such materials include ordinary bond paper, resinous transfer materials such as Mylar, polypropylene, polyethylene, Tedlar and the like. The sheet feeding mechanism 18 introduces a copy sheet 19 between feed rollers 20 and the sheet is brought into contact with the continuous web at the correct time and position to register with the developed image. The transfer of the toner powder image 16 from the web to the copy material 19 is effected, in the illustration, by means of a corona transfer device 22 which is located at or immediately after the point of contact between the transfer material and the continuous web. The corona transfer device 22 is substantially similar to the corona discharge device 10. Other conventional transfer techniques may also be employed such as a biased roller, adhesive or contact pressure transfer or by the corona spray means as illustrated. The toner particles are electrostatically transferred to the copy paper 19 at station 17. The copy material supporting the toner developer particles in an imagewise pattern is carried along an endless belt configuration 25 so as to pass beneath a fixing unit, such as, for example, a heat fuser 26, whereby the toner powder image is permanently fixed to the copy paper. After fusing, the finished copy is removed. Any suitable fixing technique may be utilized such as the heat fusing process demonstrated, a similar vapor fusing technique or by applying a laminate over the transferred toner particles. Any residual powder image left on the recycling web will not interfere with subsequent images since the web in addition to being slightly conductive and in some cases, grounded by corona charge, is presented, during subsequent development steps, to new powder over the entire area, thus minimizing the possibility of subsequent images being affected by residual powder. Thus, there is the added advantage of having an inherently self-cleaning system. It should be noted that the distance from the separation point of final development should be minimized in order to reduce dispersion of the charge after separation, which would lead to the images having poor resolution. This to some extent will be determined by the resistivity of the web material. In addition, the total time for image induction (that is, the total time the induction web is spaced contiguous with the master latent image) should be substantially longer than the time of development after separation of the flexible web from the latent image bearing drum so as to insure complete image development prior to dissipation of the induced image.

Figure 2:
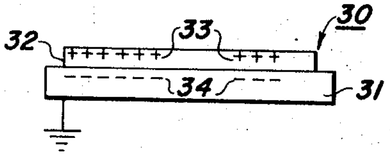
FIGS. 2–4 illustrate, in a diagrammatic manner, the induction imaging steps of an embodiment of the process of the invention.
Figure 3:
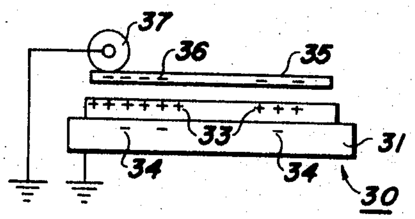

In FIG. 2 there is seen a photoconductive plate 30 made up of a grounded conductive substrate 31 having coated thereon a layer of photoconductive material 32. The photoconductive material has on its surface a positive latent electrostatic image indicated by the positive charge signs shown at 33. Corresponding to this positive charged image there is a pattern of negative charges 34 at the substrate-photoconductive layer interface. The latent electrostatic image may be formed utilizing photosensitive materials as herein illustrated or by any one of the above mentioned conventional techniques. FIG. 3 shows a web material 35 grounded by roller 37 positioned on the surface of the photoconductor 32. This web may be made up of any material having a bulk resistivity generally falling in the range of from about $10^7$ to $10^{14}$ ohm-cm. An induced charge pattern 36 is thus formed in the surface of the web material 35 corresponding to the original image 33.

Figure 4:
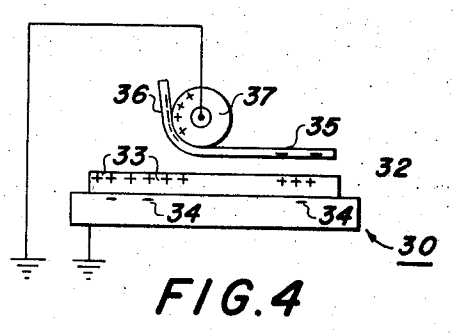

As shown in FIG. 4, when the induction web 35 is stripped from the electrostatic image bearing member 30 while the top surface of the web is grounded, as by roller 37, the induced image 36 is readily detected. To provide a uniform ground, the roller is preferably passed across the top surface of the induction web before the stripping step. Instead of being grounded, the induction roller may preferably be held at the potential of the exposed areas on the image support member 30. Thus, no charge is induced in the exposed background areas. The grounded roller 37 and substrate 31 provide a path through which the induced charges will re-distribute themselves as the gap is increased, thereby reducing the field in the air gap and preventing air breakdown across the gap. The charge pattern on the image support member after the induction web is stripped therefrom returns to the original state as shown in FIG. 2. Thus, the induction charging of the induction web has no detrimental effect on the original latent image of the image support member. This allows for subsequent imaging and development giving rise to a continuous printing system. The number of images produced is limited only by the time in which it takes for the latent image originally formed on the image support member to dissipate. In terms of a photoconductive material, this limitation is represented as a dark decay factor. When the induction web material is brought into contact with the image support member it will not come into uniform contact, but there will always be limited, point-like contact between the film and the image support surface. Between these contact points there will be a varying spacing between the two surfaces. The charge density in the continuous film as opposed to the substrate-image support interface will be in proportion to the capacitance of the average space between the web and the image support member to the capacitance of the image support layer itself. Thus, the charge density induced in the web may be increased by decreasing the average space between the web and the image support member and/or by decreasing the effective capacitance of the image support member. Within practical limits, increasing the charge density at the induction web will improve development density without experiencing detrimental effects since the original charge density at the substrate-image support interface will be retained automatically when the induction web is removed.

The process of the present invention may be utilized in conjunction with a color system wherein the original may contain a large variety of hues and colors which can be dissected by photographic techniques into the three principal subtractive primary colors magenta, cyan and yellow. The resulting color separated half-tone positives produced may then be exposed to charge photoconductive plates with the resulting image patterns wrapped onto the surface of the particular drive roller. The resulting latent images have corresponding electrostatic patterns induced in the continuous web with each respective image developed with the particular colored toner particle required. The respective colored images may then be transferred from the continuous web to a single copy sheet in perfect registration. The color developers may be brought into contact with the surface of the continuous web by any suitable technique such as by mounting individual magnetic brush development means so as to provide a rotating system. Other approaches may be utilized in presenting the colored pigment or toner to the imaged surface of the continuous web. The final image may then be fixed after making the necessary 3 or 4 transfers of colored pigment from the web to the particular copy material.

It has been determined in the course of the present invention that, upon utilization of an induction imaging process in conjunction with the contiuous web apparatus configuration as heretofore described, such a process is no longer limited as to the nature of the materials upon which the final reproduction may be made, i.e., the humidity sensitivity, smoothness and thickness thereof, nor is the process restricted by the environmental conditions under which the process may effectively be practiced. For example, the final reproduction may be effected on relatively thick, course paper. The particular embodiments of the induction imaging system of the invention described above provide wide versatility with respect to methods for develop electrostatic latent images at a point remote from the photosensitive or other original image bearing support member.

According to still another embodiment of the induction imaging system of the invention an electrostatic latent image may be induced directly in a receiver member which has a bulk resistivity of between about $10^7$ and $10^{14}$ ohm-cm. The embodiment comprises a process wherein there is provided a first surface having an electrostatic latent image thereon, positioning receiving member having a bulk resistivity of from about $10^7$ to $10^{14}$ ohm-cm. against said first surface and stripping the receiving member from the first surface. An induced electrostatic latent image is formed in the receiver sheet corresponding to the latent image carried by the first surface. The stripping of the receiver member from the image bearing support may alternatively be carried out while maintaining contiguity, at least in the region where stripping is occurring, between the free surface of the receiving member and an electrically conductive member. Where this alternative stripping mode is employed the electrically conductive member can be maintained in an ungrounded state or at a bias in the order of between ground and not to exceed the bias which would produce a field between the first surface and the bottom surface of the receiving member sufficient to produce field discharge since field discharge in effect destroys the output of multiple copy from a single electrostatic latent image feature of the invention. Also field discharge in this step would also substantially degrade even the first induced image.

Finally the induced electrostatic latent image may be rapidly utilized preferably by developing with electroscopic marking material generally within about the relaxation time of the receiving member. Development of the induced latent image may be by any development method which responds to a given image polarity. The electroscopic marking material may be applied to either surface of the receiving member (or both surfaces, for example, which may be beneficial to increase contrast density where the receiving member is transparent and, when imaged, is to be used as a projection transparency, preferably within a period beginning with stripping and extending over a period not greater than about the relaxation time of the receiving member material and typically fixing to the receiving member the marking material which is attracted thereto in image configuration. The polarity of the electroscopic marking material may be the same as or opposite to that of the charge of the master latent image on the first surface. While it is often desirable to develop the induced electrostatic latent image with toner maerial, the induced image may be used in a host of other ways, for example, electrostatic scanning systems may be used to "read" the latest image or the induced image may be transferred by TESI techniques to insulators which may hold it for a longer period of time.

Since the receiving sheet is at least slightly conductive the latent electrostatic image is induced in the receiving sheet rather than on the surface thereof as would be the case if the sheet were an insulator. This permits the toner material to be attracted to the strongest possible induced image to be developed. The induced electrostatic latent image should be developed within the relaxation time but this may be done at any time before the induced image decays, i.e., is substantially completely dissipated, but with slightly poorer density and resolution. Then, a second sheet may be placed on the first surface layer bearing the master electrostatic latent image and the stripping and developing steps may be repeated. The electrostatic latent image on the insulating layer is substantially unaffected by these steps and therefore a great many copies may be made before the master electrostatic latent image decays excessively.

The sheet of receiving material may be stripped from the imaged layer and the rest of the process automated at a rate of from about 2 to about 40, and even up to about 100 inches per second, and produce a satisfactory image. Development speed appears to be the factor limiting the overall speed of the system.

For example, in the preferred magnetic brush development mode hereof, it is preferred for optimum quality images that the stripping and developing operations take place at about 24–48 inches per second, since this rate produces optimum image quality consonant with rapid production of copies. Optimum speed is determined largely by the best compromise under a particular set of circumstances between image sharpness, i.e., resolution which increases as speeds go higher and image density which decreases at higher speeds.

Magnetic brush development produced satisfactorily dense images at speeds between about 12 and 48 inches/second and optimum quality images between about 24 and 48 inches/second with the magnetic brush rotating between about 40 to 80 r.p.m. or at a surface speed of from about 4–8 inches/second in the same direction as the advance of the paper. Under these conditions, image density was typically about 0.8 with background density not exceeding 0.1. For magnetic brush development images have been produced at speeds as high as about 100 inches/second with highest quality images produced up to speeds of about 65 inches/second. Between 65 and 100 inches/second the images showed a loss of density. The maximum development speed appears to be controlled by mechanical and inertial properties, in the preferred imaging method of the magnetic brush device. While the combination of time (speed) and conductivity effect the extent to which the image is induced and dissipated, the more consequential effect of speed proved to be completeness of the image development. The preferred toner to carrier ratio in magnetic brush development was from about 1 to 3%, with optimum at about 2%. Excessive toner concentration gives dense images but higher background while too little toner results in cleaner background but low image density and some deposition of iron filings on the paper.

For the case in which the back of the receiving member is contacted with a conducting surface at low potential the induction time constant and relaxation time constant can be quantitatively defined and calculated. However, when no such contact is made and the induction must take place through lateral migration of charge within the receiving member, the lack of simple, well defined boundary conditions renders these considerations amenable only to a more qualitative understanding. True equilibrium will not be reached, but, during virtual contact of the receiving member with the image support member, charges will separate laterally within the receiving member (usually paper) to form a latent image that will produce useful voltage contrasts upon separation from the image bearing surface.

Upon separation, the charges which were separated by induction will gradually recombine, again by lateral conduction, and development must take place before this relaxation substantially reduces the voltage contrast constituting the latent image fields. It has been found empirically that best images result when the induction time (that is, the time receiving web is maintained in virtual contact with the image bearing surface) is at least three times longer than the time between separating the receiving member from the image bearing surface and development of the induced electrostatic latent image xerographically. For practical reasons, in our equipment the ratio was typically fixed at about 10 to 1.

While conductive contact between the receiving member and the insulating image bearing support does not result with ordinary papers under substantial pressures, the air gap should be minimal. The effective air gap will be effected by the surface smoothness of the paper and the applied contact pressure. In practice, indications are that it is between about 1 and about 7 microns for smoother finish papers.

The insulating member, which bears the electrostatic latent image may be made up of any material capable of holding an electrostatic charge for sufficient time to permit the desired number of copies to be made. For example, the layer might be glass or a resin such as Lucite 2042, an ethyl methacrylate polymer or Mylar, polyethylene terephthalate; Teflon, polytetrafluorethylene; and Tedlar, polyvinyl fluoride; all available from E. I. du Pont de Nemours and Co., Inc.; Staybelite resins, a family of thermoplastic synthetic resins prepared from hydrogenated rosin and available from Hercules Powder Co.; styrene polymers such as Velsicol, a styrene terpolymer available commercially from the Velsicol Chemical Corp.; and Piccolastic resins, styrene polymers available from the Pennsylvania Industrial Chemical Corp.; ethyl cellulose; cellulose acetate; polycarbonates such as Plestar commercially available from General Aniline and Film Co.; polyethylene; polypropylene; polymeric materials such as casein and Parlon-P, the latter being a chlorinated natural rubber available from Hercules Powder Co.; and polyvinyl chloride. On such a surface an electrostatic charge may be deposited in image configuration, such as by corona discharge through a stencil. While this charge will gradually dissipate due to the inherent dark decay characteristics of the material, the charge will remain for sufficient time for a plurality of copies to be made by the process of this invention. On the other hand, the electrostatic latent image may be formed on a photoconductive insulating surface such as is described in U.S. Pat. 2,297,691 by Carlson. When such a material is used, the surface of the layer is uniformly charged as by corona discharge in the dark, then the surface is exposed to a light-and-shadow image. Because of the layer's photoconductive characteristics, the charge will be dissipated in those areas which are struck by light. The charge will remain in the nonilluminated areas. This charge will gradually be dissipated due to the dark decay characteristics of the material. However, the charge will remain for sufficient time to produce a plurality of copies by the process of this invention. Typical photoconductive materials which are suitable for use in the electrostatic latent image bearing layer useful in the process of this invention are vitreous selenium, sulfur, anthracene, inorganic photoconductive pigments such as zinc oxide, lead oxide, cadmium sulfide or cadmium sulfoselenide dispersed in inert or photoconductive binder resins, organic photoconductive pigments such as phthalocyanine and sensitized polyvinyl carbazole in inert binder resins, homogeneous layer of organic photoconductive materials, and charge-transfer complexes of Lewis acids and aromatic resins such as are disclosed in copending application 426,409 filed Jan. 18, 1965, now U.S. Pat. 3,408,183.

The conductive support material utilized in conjunction with the photoreceptors are those of the conventional materials such as aluminum, brass, copper, zinc, conductive paper, and any suitable plastic substrate or the like having the necessary conductivity properties or overlayered with a conductor.

The receiving sheet which is induction charged in image configuration and on which a visible image is then formed may be made from a wide variety of materials. It is necessary that the receiving sheet have a bulk resistivity ranging from about $10^7$ ohm-cm. to about $10^{14}$ ohm-cm. Within this range, it is preferred that the resistivity of the receiving sheet range from about $10^9$ ohm-cm. to about $10^{12}$ ohm-cm. and optimally between about $2\times10^{10}$ to about $2\times10^{12}$ ohm-cm. This is assuming the practical machine realities that image induction typically takes place, for example, over about 6 inches of drum travel, and development occurs within ¾ to 1 inch after separation, at speeds of about 24 inches/second. In order to satisfy these conditions the bulk resistivity of the paper optimally should be about $2\times10^{11}$ ohm-cm. In the case of no conductive contact to the receiving sheet while it is positioned in virtual contact with the image bearing surface, the resistivity may more appropriately be stated in terms of surface resistivity for which the optimum value is about $4\times10^{13}$ ohms, per square. It will be clear to those knowledgeable in the art that use of a thicker film will permit use of a higher volume resistivity material. Higher resistivity and/or higher surface speed will result in reduced charge induction, while lower resistivity and/or lower surface speed permits loss of image density and resolution by relaxation of the fields within the paper before development can take place. Tests show that high image quality is maintained over a range of about 2 orders of magnitude; that is, a factor of 10 above and below the optimum value. Paper is an especially suitable and desirable material since at ordinarily encountered humidities ranging from 75% RH to 10% RH, the conductivity is within the acceptable range and it is inexpensive and readily available. For operation at RH above about 50% it is desirable for best quality images to use a "warm box" to keep the paper resistivity in the optimum range which results at an RH of from about 50% to about 20%.

It should be recognized that higher speeds may be used to compensate for situations where the receiving member has a lower than optimum resistivity.

Figure 5:
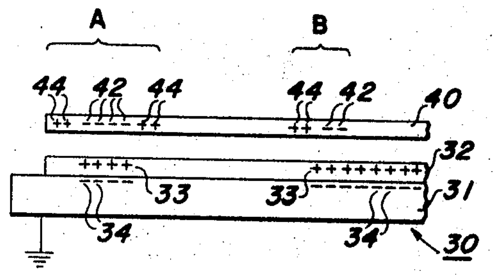
FIG. 5 illustrates, in a diagrammatic manner, the induction imaging step of another embodiment of the process of the invention.

Referring now to FIG. 5, there is seen a photoconductive plate 30 made up of a grounded conductive substrate 31 having coated thereon a layer of a photoconductor 32. The photoconductor 32 has on its surface a positive latent electrostatic image, which may be formed by any of the methods previously described, indicated by the positive charge signs shown at 33. The image sense and polarity of this master latent image may of course be positive or negative. Corresponding to this positive charge image 33, there is a pattern of negative charge 34 at the substrate-photoconductor interface. A receiving sheet 40 is positioned on the surface of the photoconductor 32.

The receiving sheet 40 may be made up of any material having a bulk resistivity of between about $10^7$ and $10^{14}$ ohm-cm. and, for example, preferably about $10^{10}$ ohm-cm. For common papers, this corresponds to a surface resistivity of between about $10^9$ and $10^{16}$ ohms per square with a preferred range of about $10^{11}$ to $10^{12}$ ohms per square. Typical of these materials are many types of paper, cellophane, and cellulose acetate. As can be seen in FIG. 5 an induced charge pattern comprised of negative charges 43 and positive charges 44 is formed in the receiving sheet. For purposes of illustration the overall charge pattern in the receiving sheet will be generally described with respect to areas A and B thereof respectively, as indicated, with area A intended to be illustrative of the induced image obtained from line copy areas of the master latent image whereas B represents the induced image obtained from portions of the master image which have uniform potential over a relatively wide area, for example, considerably more than about 1/32 inch in dimension. It will be understood by those skilled in the art that the number of negative charges 42 and the number of positive charges 44 induced in the receiving sheet 40 are exactly equal, thus resulting in a net induced charge of zero. Wherever a latent image is induced in the receiver sheet, electric fields arrange themselves on both sides of a boundary, typically about 1/32 inch in dimension and within which dimension line copy (such as the characters of this page) is generally encompassed. Thus, it can be seen that this embodiment of the invention will effectively reproduce line copy whereas solid area copy will be reproduced with an "edge-only" characteristic.

Figure 6:
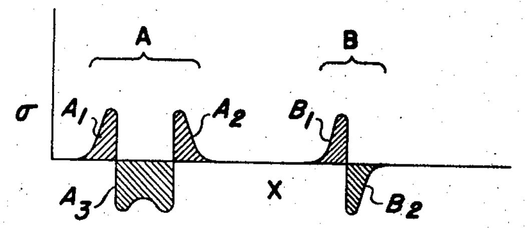
FIG. 6 is a graphical illustration of the condition of the receiver sheet of FIG. 5 with respect to the charge density of the latent electrostatic image induced therein.

FIG. 6 is a graphical illustration of the condition of the receiving sheet 40 of FIG. 5 with respect to the charge density $\sigma$ of the induced image at any position X of the sheet. Thus with relation to the area generally designated A and which is intended to be coextensive with the portion of the sheet 40 designated A in FIG. 5, areas $A_1$ and $A_2$ which represent the charge density of the positively charged portions of A are together equal to the portion designated $A_3$ and which represents the charge density of the negatively charged portion of A. Similarly with relation to the area generally designated B and intended to be coextensive with the portion of the sheet 40 designated B, area $B_1$ which represents the charge density of the positively charged portion of B is equal to the portion designated $B_2$ which represents the charge density of the negatively charged portion of B. It should be understood that these illustrations, while discussed particularly with reference to the induced image shown in the receiving sheet 40 of FIG. 5 are correspondingly generally applicable to any position of the receiving sheet which has a line copy induced image or a solid area induced image.

Figure 7:
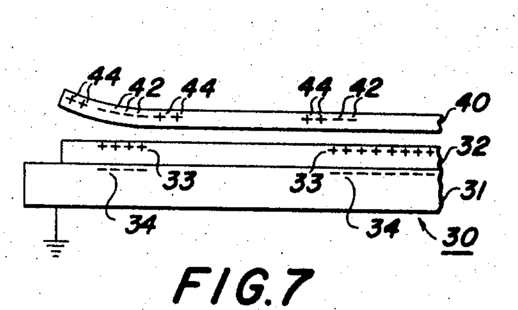
FIG. 7 illustrates diagrammatically a further step in the process shown in FIG. 5.

As shown in FIG. 7 which is a continuation of the process shown in FIG. 5, when the receiving sheet 40 is stripped from the photoconductor 32 the induced image made up of negative charges 42 and positive charges 44 is readily detected. The master latent electrostatic charge on the surface of photoconductor 32 is not affected during this process thus allowing the master latent image to be used to induce images in a multiplicity of receiver sheets.

Figure 8:
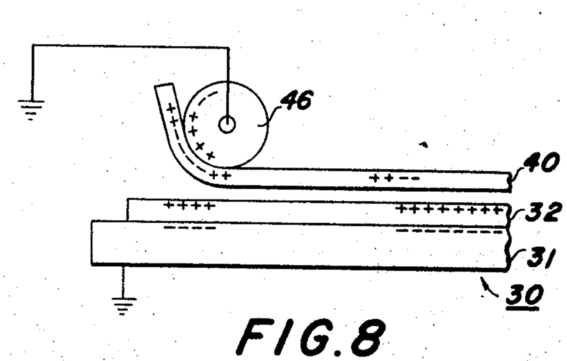
FIG. 8 illustrates diagrammatically an alternative mode of carrying out the process step shown in FIG. 7.

FIG. 8 is illustrative of another mode of stripping the receiver sheet 40 from the photoconductor 32. According to this embodiment the free surface of the receiving sheet is contiguous with an electrically conductive member 46, depicted in this illustration as a grounded conductive roller, immediately subsequent to being stripped from the photoconductor. The electrically conductive member may be grounded or at a bias and for optimum quality images should be held at about the potential and at the same polarity as the exposed areas on photoconductor 32. This potential is generally less than about 100 volts but may be as high as 300 or 400 volts. For example, in the well-known Xerox 914 copier the amorphous selenium photoconductor xerographic drum typically is initially positively charged to about 800 volts. In the discharged areas, after exposure, the surface potential is nowhere near ground potential but is about 150–200 volts. In the other well-known, commercially successful electrophotographic system using a zinc oxide photoconductor layer on a paper substrate, typically the photoconductor is initially charged negatively to about 350 volts with the surface potential in the discharged areas after exposure being about 40–80 volts.

The step of stripping the receiving member with the induced electrostatic latent image while the top surface of the receiving sheet is contiguous an electrically conductive member is preferably employed to broaden the permissible conductivity limits of the receiver members which may be utilized according to the process. As can be seen in FIG. 8, the grounded roller 46 and substrate 31 provide a path through which the induced potential in receiving sheet 40 can be balanced without air breakdown across the gap between, for example, original image 33 and the induced image in the receiver sheet. The charge pattern on the photoconductor after the receiving sheet is stripped therefrom retains its original state as shown in FIG. 5. Thus, the induction charging of the receiving sheet 40 has no detrimental effect on the positive image on the photoconductor 32. Many additional receiving sheets may then successively be induction charged. The number of receiving sheets which may be charged is essentially limited only by the time in which dark decay causes dissipation of the charge on the photoconductor. Runs of about 100 copies show almost no change in image quality but degradation sets in inter alia between about 100 and 200 prints because of some discharge of the master electrostatic latent image from the first surface and because of some discharge from the points of relatively infrequent direct contact of the receiving member to the first surface. When a receiving sheet such as paper is placed on the photoconductive layer it will not come into uniform contact with the photoconductive layer. There will always be limited, point-like contact between the receiving sheet and the photoconductive surface. Between these contact points there will be a varying spacing between the two surfaces. This varying space between the sheet 40 and layer 32 is shown schematically in the drawings as a continuous average spacing. This is illustrative only since there is contact at many spaced points. The charge density in the receiving sheet will be in proportion to the capacitance of the average space between the receiving sheet and the photoconductor to the capacitance of the photoconductive layer itself. Thus, the charge density induced in the receiving sheet may be increased by decreasing the average space between the receiving sheet and the photoconductor and/or by decreasing the effective capacitance of the photoconductive layer.

Figure 9:
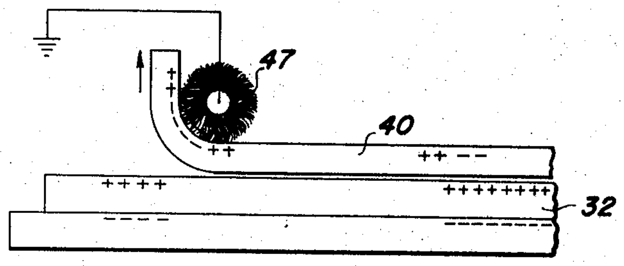
FIGS. 9 and 10 illustrate preferred forms for developing the latent electrostatic image induced in a receiver sheet according to an embodiment of the process of the invention.
Figure 10:
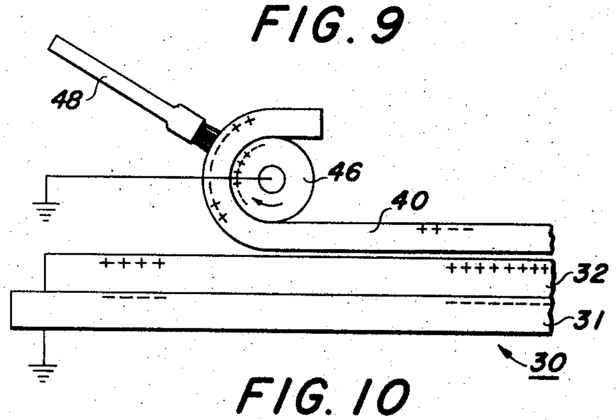

FIGS. 9 and 10 show two exemplary and preferred development modes useful in developing the electrostatic latent image induced in the receiving sheet 40. The development method shown schematically in FIG. 9 utilizes a magnetic brush arrangement to accomplish top or free surface development of the induced image in the receiving sheet. The magnetic brush 47 consists of a magnet on the surface of which is held a magnetic carrier with which is mixed a toner material. The magnetic field holds the carrier particles in a brush-like configuration. As the brush passes over imaged areas toner particles are attracted to the receiving sheet from the brush. It is preferred to use toner material which in this exemplary instance has a positive charge of polarity in order that it may be attracted to the negatively charged areas of the receiving sheet although it will be readily apparent that toner material having a negative charge of polarity can also be used in which instance the positively charged areas of the receiving sheet will be developed. The magnetic brush, as illustrated, is grounded and thus also serves as an electrically conductive member with which the receiver sheet is contiguous when being stripped from the photoconductor. As has been described previously the magnetic brush can also be at a bias provided the bias is not such as to produce a field between the photoconductive surface and the bottom surface of the receiving member sufficient to produce field discharge.

This mode of free surface development is preferred inter alia because the developing member may also serve as the contiguous electrically conductive member used in the stripping step. In the case of free surface development using a magnetic brush system using a conductive developer, the conductive developer serves as the contiguous electrically conductive member. By conductive developer is meant a development system which includes at least one conductive element.

Referring now to FIG. 10 there is shown a preferred method for bottom surface development of the image induced in the receiving sheet. As the receiving sheet is stripped from the photoconductor 32 it passes against conductive roller 46 thereby inducing positive and negative charges in the roller 46 corresponding to the charges induced in the receiving sheet. The image is then developed by magnetic brush means 48 which functions in the manner described above. Magnetic brush development is described in detail in U.S. Pats. 2,930,351 and 3,058,444.

As has been illustrated the top, i.e., free surface or the bottom surface of the receiving sheet may be developed. The latter method is more sensitive to humidity since access time is relatively longer compared with the former method in which development takes place simultaneously with the generation of fields by stripping. However, some image sharpness is lost in top, free surface development because of geometric factors of the electrostatic field spreading through the thickness of the paper.

Empirically it has been established that the maximum resolution $R_{max}$ in line pairs/mm. for top, free surface development $$\cong\frac{300}{t}$$

where $t$=the receiving member thickness in microns. For bottom surface development, resolutions of 8 l.p./mm. were obtained on thick and thin receiving members. In the bottom surface mode of development, the receiving sheet is preferably backed up with a conductive roller during separation from the master latent image. Where a conductive backup is utilized in the free surface mode of development, it is preferably provided by the developer member itself, e.g., a magnetic brush.

While the above development methods as shown in FIGS. 9 and 10 are preferred any suitable xerographic development system which responds to a given image polarity may be used to develop the induced electrostatic latent image. The only limitation is that development must take place within a short time after the receiving sheet is stripped from the photoconductive layer. Typical xerographic development methods which may be effectively used to develop the induced electrostatic latent image include cascade development as described by Walkup in U.S. Pat. 2,618,551, skid development as described by Mayo in U.S. Pat. 2,895,847, powder cloud development as described by Carlson in U.S. Pat. 2,221,776, etc.

Figure 11:
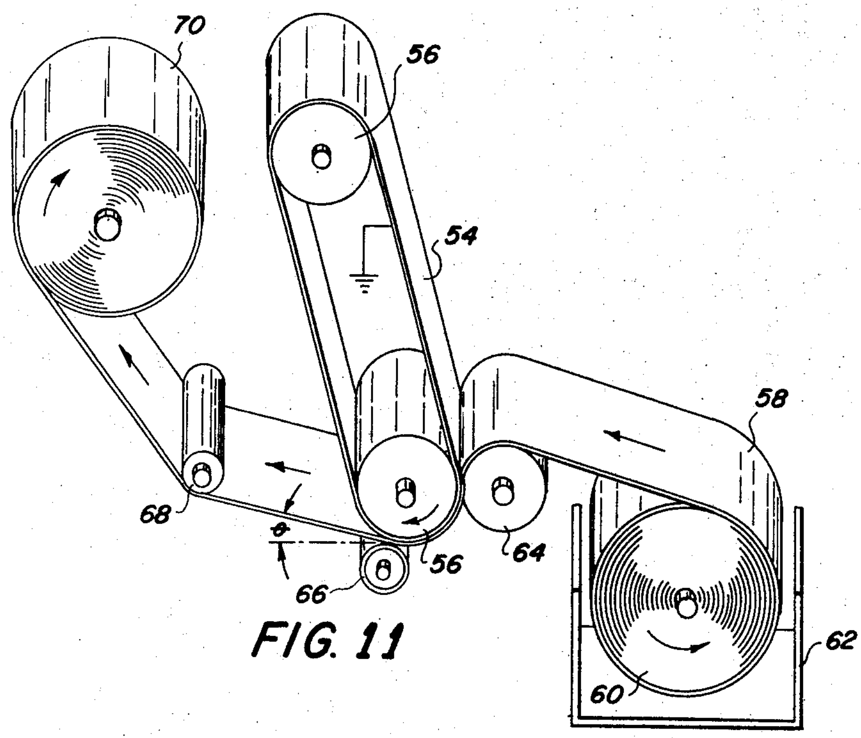
FIGS. 11 and 12 represent apparatus for carrying out preferred embodiments of the invention.

Referring now to FIG. 11 there is shown a partially schematic drawing of apparatus for carrying out an embodiment of free surface development of the invention. 54 is a flexible xerographic plate advancing in a clockwise direction around insulated rollers 56. A receiving member web 58, preferably paper in most instances is advanced in the direction of the arrows from the supply roll 60, which may be enclosed in a "warm box" arrangement 62, around roller 64, into contact with the electrostatic latent image bearing surface of the photoconductor, past magnetic brush developing means 66, past guide roller 68 onto receiving web take-up roll, 70.

Magnetic brush developing means 66, is movably mounted so that its position with respect to the line of separation from the paper of the xerographic drum may be varied. The distance from the magnetic brush and drum axis also is variable so that its interference with the drum surface may be adjusted. Developer material was Fisher Iron (100 mesh alcoholized iron filings) from Fisher Scientific Co., Fairlawn, N.J., and an electrically positive xerographic toner, for example, of an average size of about 13 microns made as disclosed in Insalaco Pat. 2,892,794.

The developed image may be fixed to the surface of the particular induction sheet or, in the case of when a continuous web-like material is utilized, transferred to a secondary receiving copy sheet. The final copy sheet may consist of conventional opaque, moisture absorbing copy paper or humidity sensitive or insensitive material of any desired thickness. Typical such materials include ordinary bond paper and resinous transfer materials such as Mylar, polypropylene, polyethylene, Tedlar, and the like. The transfer of the toner powder image or electroscopic marking particles may be made by any suitable technique such as by electrostatic transfer which entails the subjecting of the free surface of the copy sheet to an electrostatic or corona charge opposite to the polarity of the toner particles. Other transfer techniques may be utilized such as biased roller transfer or adhesive or contact pressure procedures. The image is then fixed to the surface of the final copy sheet, whether it be the original induction material or a secondary receiving material, by one of a number of available techniques such as heat fusing, vapor fusing, or by applying a laminate over the transferred toner particles.

It is found that when a warm box 62, is employed the box need not be especially well sealed, i.e., it need not seal out moisture but must simply maintain the air inside at the stated temperature increment over the room temperature. The paper showed no noticeable change if it was processed within about 30 seconds after leaving the warm box. It was found that a low wattage light bulb maintained the inside of the warm box about 20° C. above the outside ambient room temperature which kept the RH in the warm box in the optimum range of from about 20% to 50% for even the maximum ambient indoor RH of about 90%.

When the magnetic brush unit developed the paper mostly before the line of separation from the xerographic drum, weak, i.e., lower density, images resulted. If the entire brush contact zone was located well after the line of separation of the paper from the drum, some sparking occurred and image density was reduced. The optimum results were obtained when the magnetic brush was located so that its band of contact started at the line of paper separation and extended through separation.

Figure 12:
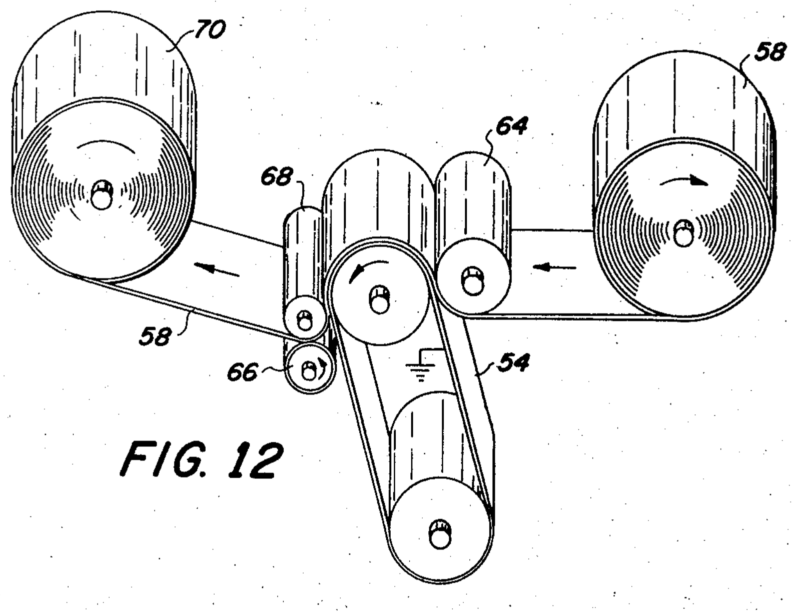

FIG. 12 is a similar configuration showing bottom surface development.

While both FIGS. 11 and 12 have guide rollers guiding the image receiving web 58 into contact with the electrostatic master image another desirable embodiment, especially where the receiving member is in web form is to just hold the web taut in contact with the electrostatic master image with no guide rolls which eliminates any possibility of charge build-up on the guide rolls.

Various preferred embodiments of the induction imaging system of the invention having been described in detail above, the invention will now be further illustrated with respect to examples of specific preferred embodiments thereof, these being intended to be illustrative of the invention only. It should be recognized that the invention is not limited to the materials, percentages and other particulars recited in the examples. The parts and percentages stated therein are by weight unless otherwise indicated. Examples I–III are directed to the mode wherein a latent electrostatic image is induced in a continuous induction web, developed thereon and transferred to a receiver material. Examples IV–XVII are directed to the mode wherein the latent image is induced in a receiver material having a resistivity of from about $10^7$–$10^{14}$ ohm-cm.

Example I

A xerographic plate comprising an aluminum substrate having a 50 micron layer of vitreous selenium coated thereon is uniformly charged to a potential of about 800 volts by means of a corona discharge in the dark. A wrong reading light and shadow pattern is projected onto the surface of the charged plate, thereby dissipating the charge in the light struck areas. The resulting image support member is brought into rotary contact with a doped Mylar sheet 50 microns thick and of resistivity $10^{13}$ ohm-cm. The surface of the Mylar web is engaged with a conductive rubber roller which is contacted tangentially with the continuous Mylar web while being maintained at a potential of about +100 volts. During the process of rotating the drive roller the Mylar sheet becomes separated from both the roller and the aluminum image support member. At the point of separation the Mylar web is brought into contact with a conductive magnetic brush development member held at a potential of about 100 volts. Toner particles are deposited in a pattern conforming to the original image. The Mylar sheet bearing the powdered image is in turn contacted with the surface of an ordinary bond paper at a relative humidity of about 20 percent, the rear surface of which is charged by a corona spray to about 1,000 volts. The bond paper is about 4 mils thick. The toner particles are transferred to the paper copy sheet to which they are fused by the application of heat to the fusing point of the toner. The resulting image is then cooled, thereby permanently fixing itself to the copy paper. An excellent image of high density and sharpness is obtained. The above process is repeated until a number of copies of the image are reproduced. The quality of the images on the subsequent sheets of paper continues to be excellent, thus demonstrating the multiple imaging capabilities of the present system.

Example II

The process of Example I is repeated with the exception that a Tedlar film is substituted for the Mylar web. The quality of the images produced is again excellent for the plural number of copies produced. The copy paper to which the resinous image is transferred is at equilibrium with a relative humidity measuring about 50 percent and is about 3.5 mils thick.

Example III

The process steps of Example I are repeated with the exception that a polyethylene impregnated paper is substituted for the Mylar web and the final copy paper is in equilibrium with air at a relative humidity of greater than 75 percent and has a thickness of 3.8 mil. Similar results are obtained.

Example IV

A xerographic plate comprising an aluminum substrate having a 50 micron layer of vitreous selenium coated thereon is uniformly charged to a potential of about 800 volts, by means of corona discharge in the dark. A right-reading light-and-shadow pattern is projected onto the charged plate, thereby dissipating the charge in light-struck areas. A sheet of Baylawn Manifold 9 lb. substance paper (made by Green Bay Tissue Mills which has been maintained at a relative humidity of about 10 percent is positioned on the surface of the plate. After sufficient image induction, the paper sheet is then stripped from the plate at a rate of about 10 inches per second. During stripping the top surface at the point of separation is in contact with a conductive magnetic brush developing member held at a potential of about 100 volts; such as is described in U.S. Pat. 2,930,351. Toner particles are deposited in a pattern conforming to the original. The paper sheet bearing the powder image is heated to the fusing point of the toner and then cooled, thereby permanently fixing the image. An excellent image of high density and sharpness of about 10 line pairs per millimeter, is observed. The above process is repeated 25 times with 25 additional sheets of paper. The quality of the images on these sheets continues to be excellent. A very slight, almost unnoticeable decrease in image density is observed. This is due to the dark decay characteristics of the photoconductive layer. This gradual dissipation of the charges in the photoconductive layer is so gradual, however, that a very great number of satisfactory copies may be made from a single image.

Example V

The process steps of Example IV above are repeated with the exception that the paper sheet is stripped from the plate without the top surface of the paper being in contact, at the point of separation, with an electrically conductive member. The magnetic brush developing member utilized in this instance is not conductive. Similar results are obtained.

Example VI

The process steps of Example IV above are repeated, using paper having a relative humidity of about 30 percent. The quality of the images produced is again excellent, however, maximum resolution is reduced to about 4 line pairs per mm. Again, a plurality of duplicate copies may be made with little loss in quality.

Example VII

The process steps of Example IV above are repeated, using paper having a relative humidity of about 50 percent. The images produced are still of good density. However, the sharpness is not quite as high as with the images made on paper of lower humidity.

Example VIII

The process steps of Example IV above are repeated. Here, however, instead of the paper sheet, a sheet of cellophane having a thickness of about 50 microns and a relative humidity of about 50 percent is used. The powder image is fixed to the cellophane by exposing to trichloroethylene vapors. Excellent images result and again a plurality of nearly equally good copies can be made.

Example IX

The imaging and developing steps are carried out as in Example IV. Here, however, the magnetic brush developing member is brought into contact with the lower surface of the paper sheet (at 10% relative humidity) as it is stripped from the plate. This configuration is that shown in FIG. 10. The resulting image is of excellent quality and is sharper than that produced in Example IV, since there is no field spreading, because the field does not pass through the paper.

Example X

The steps of Example IX are repeated with paper at a relative humidity of about 50%. A satisfactory image is produced, though of lower density and sharpness than that of Example VI. The decrease in quality here is a result of the time between stripping of the sheet and development, the paper being more conductive at the higher humidity which permitted more rapid decay of the electrostatic latent image.

Example XI

A photoconductive plate is charged and imaged as in Example IV above. A sheet of Baylawn Manifold paper at a relative humidity of about 10 percent is placed on the plate. After sufficient image induction, the sheet is stripped from the plate while in contact with a conductive donor sheet which has on its surface a coating of electroscopic marking material. This material is transferred to the paper sheet in imaged areas. This method of development, generally known as "touchdown" development, is described in detail in copending application, Ser. No. 328,984, filed Dec. 9, 1963, now U.S. Pat. No. 3,332,396. An image of excellent quality is produced. The above process steps are repeated with 25 additional sheets of paper. Image quality is uniformly high, with very slight decrease in quality from the first to the 25th copy.

Example XII

A photoconductor plate comprising an aluminum substrate having a 50 micron layer of vitreous selenium coated thereon is uniformly charged to a potential of about +600 volts by means of a corona discharge in the dark. A cathode ray tube display image is projected onto the surface of the charged plate thereby dissipating the charge in the light struck areas and producing a right reading image. A sheet of Baylawn Manifold 9 pound substance paper made by Green Bay Tissue Mills and being at equilibrium with air at a relative humidity of about 10% is positioned on the imaged surface of the plate. After sufficient image induction, the paper sheet is then stripped from the plate at a rate of about 10 inches per second. During stripping the top or free surface of the paper sheet is contacted at the point of separation with a conductive magnetic brush developer unit held at a potential of about +600 volts and comprising negatively charged toner particles. Toner particles are deposited in a pattern conforming to the positively charged areas of the induced latent image. The paper sheet bearing the powder image is heated to the fusing point of the toner and then cooled, thereby permanently fixing the image to the induction sheet. An excellent positive image of high density and sharpness of about 10 line pairs per mm. is observed. The above process of positioning, stripping, developing and fusing is repeated 25 times for 25 additional sheets of paper. The quality of the images on these sheets continues to be excellent. A very slight almost unnoticeable decrease in image density is observed, this being due to the dark decay characteristics of the photoconductive layer. This gradual dissipation of the charges in the photoconductive layer does not markedly affect the subsequent quality of the prints produced.

Example XIII

The process steps of Example XII are repeated using an induction paper at equilibrium with air at a relative humidity of about 30%. Similar results as obtained in Example IV are demonstrated, except maximum resolution is about 6 l.p./mm.

Example XIV

A xerographic plate comprising an aluminum substrate having a 50 micron layer of vitreous selenium coated thereon is uniformly charged to a potential of about +600 volts by means of a corona discharge in the dark. A cathode ray display image is projected into the surface of the charged plate, thereby dissipating the charge in the light struck areas and producing a wrong reading image. The resulting image support member is brought into rotary contact with a doped Nylon web 50 microns thick, having a resistivity of about $10^{13}$ ohm-cm. During the process of rotation the Nylon web becomes separated from the image support member. At the point of separation the free surface of the nylon web is brought into contact with a conductive magnetic brush development member held to a potential of about +600 volts and comprising negatively charged toner particles. Toner particles are deposited in a pattern conforming to the original cathode ray tube display image. The Nylon web bearing the powdered image is then in turn contacted with the surface of an ordinary bond paper at a relatiive humidity of about 20%, the rear surface of which is charged by a corona spray to about +1000 volts. The bond paper is about 4 mils thick. The toner particles are transferred to the paper copy sheet to which they are fused by the application of heat at the fusing point of the toner particles. The resulting right reading image is then cooled, thereby permanently fixing itself to the copy paper. An excellent image of high density and sharpness is obtained. The above process is repeated until a number of copies of the image are produced. The quality of the images on the subsequent sheets of paper continues to be excellent thus demonstrating the multiple imaging capabilities of the present system.

Example XV

The process of Example XIV is repeated with the exception that a Tedlar film is substituted for the Nylon web. The quality of the images produced is again excellent for the plural number of copies produced. The copy paper to which the resinous image is transferred is at equilibrium with a relative humidity measuring about 50% and is about 3.5 mils thick.

Example XVI

The process steps of Example XIV are repeated with the exception that a polyethylene impregnated paper is substituted for the Nylon web and the final copy paper is in equilibrium with air at a relative humidity of greater than 75% and has a thickness of about 3.8 mil. Similar results as obtained in Example XIV are realized.

Example XVII

A photoconductive plate comprising an aluminum substrate having a 50 micron layer of vitreous selenium coated thereon is uniformly charged to a potential of about +600 volts by means of a corona discharge in the dark. A cathode ray tube display image is projected onto the surface of the charged plate thereby dissipating the charge in the light struck areas and producing a wrong reading image. Following the procedure of Example XII an image is induced in a paper induction sheet and the induction sheet separated from the master image support against a conductive rubber roller biased to a potential of about +600 volts. The front surface of the induction paper is contacted with a magnetic brush developer biased to about +600 volts and comprising negatively charged toner particles. The resulting image is heat fixed to the surface of the paper sheet and cooled thereby permanently fixing the image to the induction sheet. High quality images are obtained.

In all of Examples XII–XVII the display portions of the CRT image are reproduced as a black image on the typically lighter background of the receiving member.

Although the present examples were specific in terms of conditions and materials used, any of the above listed typical materials may be substituted when suitable in the above listed examples with similar results being obtained. In addition to the steps used to carry out the process of the present invention, other steps or modifications may be used, if desirable. For example, the induction imaging system may be adopted to a specific continuous tone imaging process. In addition, other materials may be incorporated in or coated on the developer, photoconductor material and receiving members which will enhance, synergize, or otherwise desirably effect the properties of these materials for their present use. For example, the spectral sensitivity of the plates prepared and used in conjunction with the present system may be modified by incorporating photo-sensitizing dyes therein.

"Contiguous," and variant forms thereof for the purposes of this invention, is defined as in Webster's New Collegiate Dictionary, second edition, 1960; "In actual contact; touching; also, near, though not in contact; adjoining."

While the invention has been described in detail with respect to various preferred embodiments thereof and further in relation to specific examples, it is not intended to be limited thereto but rather it will be appreciated by those skilled in the art that variations and modifications of the invention are possible which are within the spirit of the invention and the scope of the claims.

What is claimed is:

1. An imaging method comprising the steps of (a) providing a first surface having an electrostatic latent image thereon;

(b) positioning a receiving member having a bulk resistivity between about $10^7$ and $10^{14}$ ohm-cm. against said first surface for a period of time sufficient to induce an electrostatic latent image in said receiving member, said receiving member being free of any contact with ground or an externally applied potential or a conductive member while in contact with said first surface, wherein the magnitude of said electrostatic latent image on said first surface and the contact between said first surface and said receiving member are such that field discharge does not occur between said first surface and said receiving member; and (c) stripping said receiving member from said first surface whereby said induced electrostatic latent image is maintained in said receiving member.

2. The imaging method as defined in claim 1 wherein the bulk resistivity of the receiving member is between about $10^9$ and $10^{12}$ ohm-cm.

3. The imaging method as defined in claim 1 and further including the step of developing at least portions of said induced latent electrostatic image within a period beginning with the stripping of corresponding portions of said receiving member and extending for a period equal to about the relaxation time of the receiving member material.

4. The imaging method as defined in claim 1 and further including the step of developing said induced electrostatic latent image with electroscopic marking material within the period between stripping of said receiving member from said first surface and the relaxation time of the receiving member material.

5. The imaging method as defined in claim 4 in which the period over which said receiving member is positioned against said first surface is at least three times longer than the time between stripping and development.

6. The imaging method as defined in claim 4 wherein the bulk resistivity of the receiving member is between about $10^9$ and $10^{12}$ ohm-cm.

7. The imaging method as defined in claim 6 wherein at least portions of said induced electrostatic latent image are developed, immediately after stripping of corresponding portions of said receiving member by applying electroscopic marking material to the bottom surface of the receiving member.

8. The imaging method as defined in claim 6 wherein at least portions of said induced electrostatic latent image are developed, immediately after stripping of corresponding portions of said receiving member by applying electroscopic marking material to the free surface of said receiving member.

9. The imaging method as defined in claim 1 and further including the step of transferring said induced electrostatic latent image to a highly insulating surface by electrostatic transfer techniques.

10. An imaging method comprising the steps of (a) providing a first surface having a latent electrostatic image thereon;

(b) positioning a receiving member with a bulk resistivity between about $10^7$ and $10^{14}$ ohm-cm. against said first surface for a period of time sufficient to induce an electrostatic latent image on said receiving member, said receiving member being free of any contact with ground or an externally applied potential or a conductive member while in contact with said first surface, wherein the magnitude of said electrostatic latent image on said first surface and the contact between said first surface and said receiving member are such that field discharge does not occur between said first surface and said receiving member; and (c) stripping said receiving member from said first surface while maintaining contiguity, at least in the region where stripping is occurring, between the free surface of said receiving member and an electrically conductive member ungrounded or at a bias in the order of between ground and not to exceed the bias which would produce a field between said first surface and the bottom surface of the receiving member sufficient to produce field discharge; whereby said induced electrostatic latent image is maintained in said receiving member.

11. The imaging method as defined in claim 10 and further including the step of developing said induced electrostatic latent image with electroscopic marking material within the period between stripping of said receiving member from said first surface and the relaxation time of the receiving member material.

12. The imaging method as defined in claim 10 and further including the step of developing at least portions of said induced electrostatic latent image within a period beginning with the stripping of corresponding portions of said receiving member and extending for a period equal to about the relaxation time of the receiving member material.

13. The imaging method as defined in claim 11 wherein at least portions of said induced electrostatic latent image are developed simultaneously with or immediately after the stripping of corresponding portions of said receiving member, by applying electroscopic marking material to the free surface of the receiving member.

14. The imaging method as defined in claim 11 wherein at least portions of said induced electrostatic latent image are developed, simultaneously with or immediately after the stripping of corresponding portions of said receiving member by applying electroscopic marking material to the bottom surface of the receiving member.

15. The imaging method as defined in claim 10 wherein the bulk resistivity of the receiving member is between about $10^9$ and $10^{12}$ ohm-cm.

16. The imaging method as defined in claim 11 wherein the induced electrostatic latent image is developed with electroscopic marking material of the same polarity as that of the electrostatic latent image on said first surface.

17. The imaging method as defined in claim 11 wherein the induced electrostatic latent image is developed with electroscopic marking material with a polarity opposite to that of the electrostatic latent image on said first surface.

18. The imaging method as defined in claim 13 wherein said electrostatic marking material is applied from the electrically conductive member used in the stripping step.

19. The imaging method as defined in claim 10 wherein said receiving member is paper.

20. The imaging method as defined in claim 18 wherein the electrically conductive member used to apply said electroscopic marking material is a magnetic brush developing member having magnetic carrier held in a magnetic field and powdered electroscopic marking material held triboelectrically to said magnetic carrier material.

21. The imaging method as defined in claim 13 wherein said electroscopic marking material is applied by contacting said receiving member with a magnetic brush developing member having magnetic carrier held in a magnetic field and powdered electroscopic marking material held triboelectrically to said magnetic carrier material.

22. The imaging method as defined in claim 14 wherein said electroscopic marking material is applied by contacting said receiving member with a magnetic brush developing member having a magnetic carrier held in a magnetic field and powdered electroscopic marking material held triboelectrically to said magnetic carrier material.

23. The imaging method as defined in claim 14 wherein said electroscopic marking material is applied from a marking material loaded donor surface continuously presenting new donor surfaces loaded with toner to new portions of the bottom surface of the receiving member.

24. The imaging method as defined in claim 23 wherein said donor surface is a magnetic brush developing member having magnetic carrier held in a magnetic field and powdered electroscopic marking material held triboelectrically to said magnetic carrier material.

25. The imaging method as defined in claim 18 wherein the electrically conductive member used to apply said electroscopic marking material is a sheet which is laid marking material side down on the receiving member in contact with those portions of the receiving member desired to be developed.

26. The imaging method as defined in claim 11 wherein said receiving member is paper at a relative humidity of between about 75% and 5% relative humidity, wherein said paper is stripped at a rate of between about 2 to about 65 inches per second and wherein the time that the paper is positioned against said first surface is at least 3 times longer than the time between stripping and development.

27. The imaging method as defined in claim 26 wherein steps (b) and (c) of claim 10 are repeated for at least one additional paper receiving member.

28. The imaging method as defined in claim 11 wherein said receiving member is a continuous web.

29. The imaging method as defined in claim 28 wherein after development said developed image is transferred to a copy receiving sheet.

30. The imaging method as defined in claim 10 and further including the step of transferring said induced electrostatic latent image to a highly insulating surface by electrostatic transfer techniques.

References Cited

UNITED STATES PATENTS

| | | | |
|---|---|---|---|
| 3,551,146 | 12/1970 | Gundlach | 96—1 |
| 3,084,061 | 4/1963 | Hall | 117—17.5 |
| 3,556,784 | 1/1971 | Robinson et al. | 96—1 |
| 2,990,278 | 6/1961 | Carlson | 96—1.4 |
| 2,982,647 | 5/1961 | Carlson et al. | 96—1 |
| 3,280,741 | 10/1966 | Seymour | 252—62.1 X |

CHARLES E. VAN HORN, Primary Examiner

U.S. Cl. X.R.

76—1.4; 117—17.5, 371 E; 118—637; 346—74 ES; 355—3